(12) United States Patent
Sawada

(10) Patent No.: US 11,527,758 B2
(45) Date of Patent: Dec. 13, 2022

(54) ALUMINUM FOIL AND ALUMINUM MEMBER FOR ELECTRODES

(71) Applicant: FUJIFILM Corporation, Tokyo (JP)

(72) Inventor: Hirokazu Sawada, Shizuoka (JP)

(73) Assignee: FUJIFILM Corporation, Tokyo (JP)

( * ) Notice: Subject to any disclaimer, the term of this patent is extended or adjusted under 35 U.S.C. 154(b) by 328 days.

(21) Appl. No.: 16/848,949

(22) Filed: Apr. 15, 2020

(65) Prior Publication Data

US 2020/0243865 A1 Jul. 30, 2020

Related U.S. Application Data (63) Continuation of application No. PCT/JP2018/036858, filed on Oct. 2, 2018.

(30) Foreign Application Priority Data

Oct. 16, 2017 (JP) .............................. JP2017-200347

(51) Int. Cl.
*H01M 4/66* (2006.01)
*H01G 11/46* (2013.01)
*H01M 4/70* (2006.01)
*H01G 11/26* (2013.01)
*H01M 10/0525* (2010.01)

(52) U.S. Cl.
CPC ............ *H01M 4/661* (2013.01); *H01G 11/26* (2013.01); *H01G 11/46* (2013.01); *H01M 4/667* (2013.01); *H01M 4/70* (2013.01); *H01M 10/0525* (2013.01)

(58) Field of Classification Search
CPC ........ H01M 4/661; H01M 4/667; H01M 4/70; H01M 10/0525; H01G 11/26; H01G 11/46
See application file for complete search history.

(56) References Cited

U.S. PATENT DOCUMENTS

| | | | |
|---|---|---|---|
| 2013/0052589 | A1 | 2/2013 | Hayashi |
| 2017/0200568 | A1 | 7/2017 | Kawaguchi |
| 2017/0352866 | A1* | 12/2017 | Kawai ................ H01G 9/045 |
| 2018/0013148 | A1 | 1/2018 | Matsuura et al. |
| 2018/0166690 | A1* | 6/2018 | Kozawa ............... H01M 4/742 |
| 2018/0264851 | A1 | 9/2018 | De Roeck et al. |

(Continued)

FOREIGN PATENT DOCUMENTS

| | | |
|---|---|---|
| CN | 1181404 A | 5/1998 |
| CN | 103917919 A | 7/2014 |
| CN | 107075714 A | 8/2017 |

(Continued)

OTHER PUBLICATIONS

International Search Report dated Oct. 30, 2018 in International Application No. PCT/JP2018/036858.

(Continued)

*Primary Examiner* — Stewart A Fraser
(74) *Attorney, Agent, or Firm* — Sughrue Mion, PLLC (57) ABSTRACT

An object of the present invention is to provide an aluminum foil and an aluminum member for electrodes having good adhesiveness to an electrode material and high conductivity with the electrode material. Provided is an aluminum foil having through holes including an aluminum oxide film having a thickness of 25 nm or less on a surface of the aluminum foil, and further a hydrophilic layer on a part of a surface of the aluminum oxide film.

16 Claims, 2 Drawing Sheets

(56) References Cited

U.S. PATENT DOCUMENTS

2019/0003073 A1  1/2019  Kasuya et al.

FOREIGN PATENT DOCUMENTS

| EP | 3138691 A1 | 3/2017 | | |
|---|---|---|---|---|
| JP | 2013-218813 A | 10/2013 | | |
| WO | WO-2010004398 A1 | * | 1/2010 | .......... H01M 10/052 |
| WO | 2016/158245 A1 | 10/2016 | | |
| WO | 2017/163913 A1 | 9/2017 | | |

OTHER PUBLICATIONS

Written Opinion of the International Searching Authority dated Oct. 30, 2018 in International Application No. PCT/JP2018/036858.
International Preliminary Report on Patentability dated Apr. 21, 2020 in International Application No. PCT/JP2018/036858.
Communication dated Jul. 21, 2021 from The State Intellectual Property Office of P.R. of China in English Application No. 201880067332.8.

* cited by examiner

ALUMINUM FOIL AND ALUMINUM MEMBER FOR ELECTRODES

CROSS-REFERENCE TO RELATED APPLICATIONS

This application is a Continuation of PCT International Application No. PCT/JP2018/036858 filed on Oct. 2, 2018, which claims priority under 35 U.S.C. § 119(a) to Japanese Patent Application No. 2017-200347 filed on Oct. 16, 2017. The above application is hereby expressly incorporated by reference, in its entirety, into the present application.

BACKGROUND OF THE INVENTION

1. Field of the Invention

The present invention relates to an aluminum foil and an aluminum member for electrodes.

2. Description of the Related Art

In recent years, in response to the development of portable devices such as personal computers and mobile phones, hybrid vehicles, electric vehicles, and the like, the demand for power storage devices, particularly, lithium ion capacitors, lithium ion secondary batteries, and electric double layer capacitors as power supplies has been increased.

It is known that an aluminum plate is used as a current collector for electrodes (hereinafter, simply referred to as a "current collector") used for a positive electrode or a negative electrode of such a power storage device. In addition, it is known that an active material such as activated carbon is applied to the surface of the current collector formed of the aluminum plate as an electrode material, and is used as a positive electrode or a negative electrode.

In a large capacity next-generation secondary battery, a large amount of Li (lithium) ions are doped into an electrode in advance according to the material of the electrode material in order to secure a sufficient capacity. As a method of doping Li ions, a method is known in which Li metal is put into a battery cell and dissolution in the battery cell is promoted, so that excess Li ions are spread to the electrode. The electrode material is originally a porous material that transmits Li ions. On the other hand, a current collector serving as a support for an electrode material and serving as a conductive plate for taking in and out of electricity during charging and discharging is usually formed of a metal foil, and conducts electricity but does not allow ions to pass therethrough. Therefore, in order to spread Li ions to every corner of the electrode material in the battery cell, a perforated foil provided with a large number of through holes for allowing Li ions to pass through a metal foil is used.

For example, WO2016/158245A discloses an aluminum plate having a plurality of through holes in a thickness direction, in which a thickness thereof is 40 μm or less, an average opening diameter of the through holes is 0.1 to 100 μm, an average opening ratio by the through holes is 2% to 30%, a Fe content is 0.03% by mass or more, and a ratio of the Fe content to a Si content is 1.0 or more. It is described that this aluminum plate is used as a current collector for a power storage device.

SUMMARY OF THE INVENTION

Here, the perforated foil is required to have an affinity with the electrode material in order to reduce the contact resistance with the electrode material. In a case where the affinity with the electrode material is high, the electrode material enters the through holes, leading to high adhesiveness. The high adhesiveness can reduce the contact resistance, and can avoid the risk of the electrode material peeling off from the current collector even in a case where charging and discharging are performed many times, and exhibit excellent cycle characteristics.

An electrode material for a positive electrode in a next-generation secondary battery is prepared as an aqueous coating solution and is applied to a perforated foil serving as a current collector. Therefore, it is desirable that the perforated foil for a positive electrode is hydrophilic. Aluminum and chromium are known as metals exhibiting hydrophilicity, and of these metals, it is desirable to use aluminum having a small environmental effect for a positive electrode current collector.

However, in order to obtain further hydrophilicity with the electrode material for a positive electrode, it is not sufficient to use aluminum only as the material of the perforated foil serving as the current collector. Therefore, it is considered to provide a hydrophilic layer on the surface of the perforated foil. However, since the hydrophilic layer may cause electric resistance, in a case where the hydrophilic layer is simply provided, the conductivity between the electrode material and the perforated foil may be reduced.

Therefore, an object of the present invention is to provide an aluminum foil having good adhesiveness to an electrode material and high conductivity with the electrode material, and an aluminum member for electrodes.

As a result of conducting intensive studies to achieve the above object, the present inventors have found that the above object can be achieved by providing an aluminum foil having through holes including an aluminum oxide film having a thickness of 25 nm or less on a surface of the aluminum foil, and further including a hydrophilic layer on at least a part of a surface of the aluminum oxide film, and thus have completed the present invention.

That is, the above object can be achieved by the following constitutions.

[1] An aluminum foil having through holes comprising: an aluminum oxide film having a thickness of 25 nm or less on a surface of the aluminum foil; and further a hydrophilic layer on at least a part of a surface of the aluminum oxide film.

[2] The aluminum foil according to [1], in which the aluminum oxide film has a density of 2.7 to 4.1 $g/cm^3$.

[3] The aluminum foil according to [1] or [2], in which the aluminum oxide film having a thickness of 25 nm or less contains at least one of aluminum oxide, aluminum oxide monohydrate, or aluminum oxide trihydrate.

[4] The aluminum foil according to any one of [1] to [3], in which the aluminum oxide film has a thickness of 1 nm to 15 nm.

[5] The aluminum foil according to any one of [1] to [4], in which the hydrophilic layer contains a compound having at least one structure selected from the group consisting of silicate, phosphate, sulfonic acid, sulfonate, phosphonic acid, phosphonate, phosphate ester, phosphate ester salt, and fluorinated zirconic acid.

[6] The aluminum foil according to any one of [1] to [5], in which an average opening diameter of the through holes is 1 μm to 500 μm.

[7] The aluminum foil according to any one of [1] to [6], in which a hole density of the through holes is 1 to 1000 holes/$mm^2$.

[8] The aluminum foil according to any one of [1] to [7], in which the aluminum foil has a thickness of 5 μm to 100 μm.

[9] The aluminum foil according to any one of [1] to [8], in which the aluminum oxide film is provided on both surfaces of the aluminum foil, and further the hydrophilic layer is provided on at least a part of the surface of each of the aluminum oxide films on the both surfaces.

[10] An aluminum member for electrodes using the aluminum foil according to any one of [1] to [9].

As described below, according to the present invention, it is possible to provide an aluminum foil having good adhesiveness to an electrode material and high conductivity to the electrode material, and an electrode aluminum member.

DESCRIPTION OF THE PREFERRED EMBODIMENTS

Hereinafter, the present invention will be described in detail.

The descriptions of the constituent features described below may be made based on representative embodiments of the present invention, but the present invention is not limited to such embodiments.

In the specification, a numerical range expressed by using "to" means a range including numerical values described before and after "to" as a lower limit and an upper limit.

[Aluminum Foil]

An aluminum foil according to an embodiment of the present invention is an aluminum foil having through holes including an aluminum oxide film having a thickness of 25 nm or less on a surface of the aluminum foil, and further including a hydrophilic layer on at least a part of the surface of the aluminum oxide film.

Next, the constitution of the aluminum foil according to the embodiment of the present invention will be described using FIG. 1.

Figure 1:
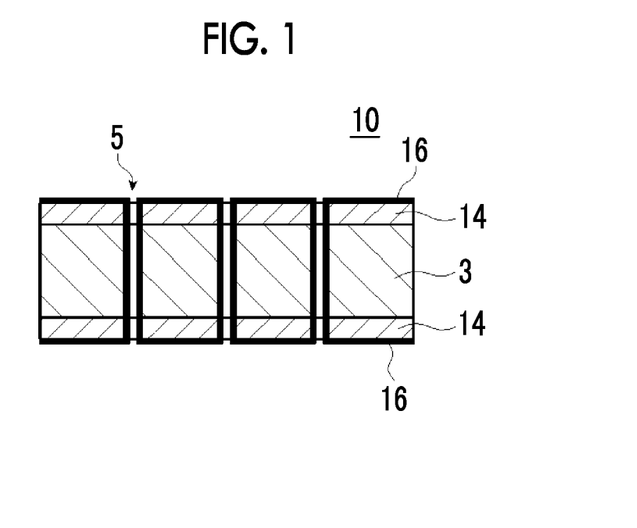
FIG. 1 is a cross-sectional view schematically showing an example of an aluminum foil of the present invention.
Figure 2:
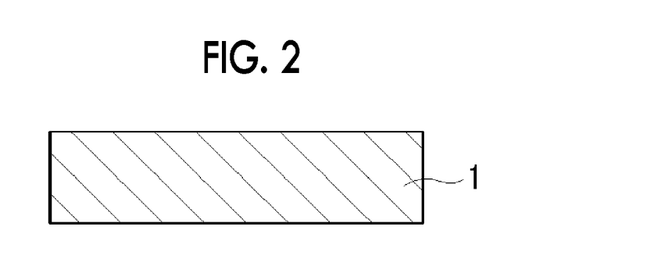
FIG. 2 is a schematic cross-sectional view for describing the example of a suitable method of producing the aluminum foil of the present invention.
Figure 3:
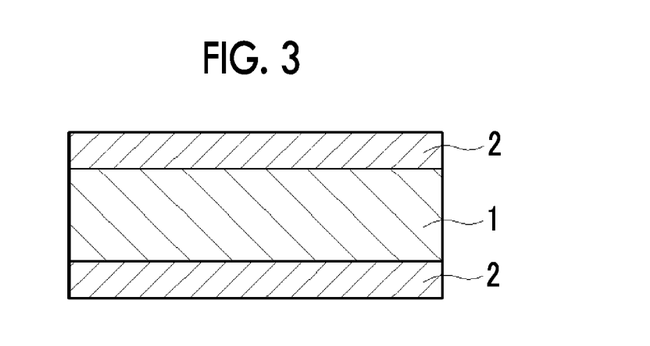
FIG. 3 is a schematic cross-sectional view for describing the example of the suitable method of producing the aluminum foil of the present invention.
Figure 4:
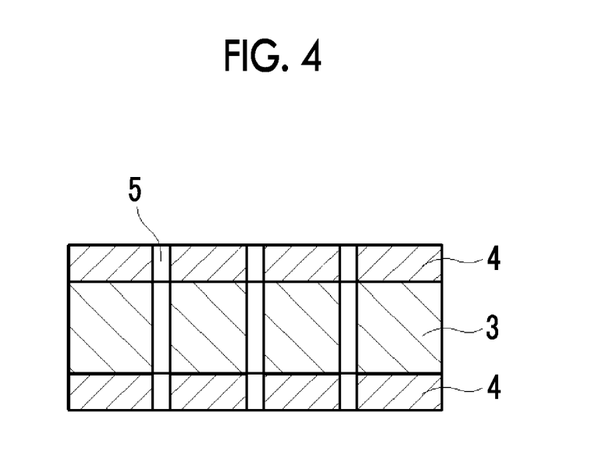
FIG. 4 is a schematic cross-sectional view for describing the example of the suitable method of producing the aluminum foil of the present invention.
Figure 5:
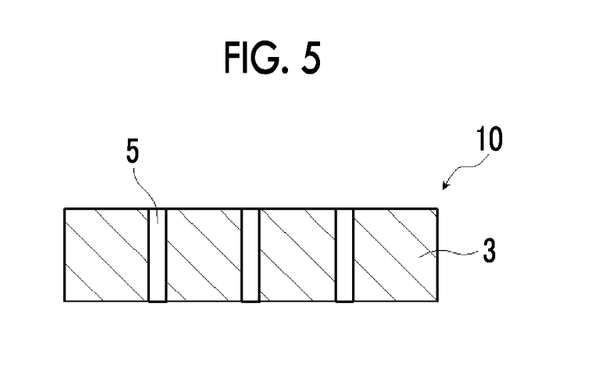
FIG. 5 is a schematic cross-sectional view for describing the example of the suitable method of producing the aluminum foil of the present invention.

FIG. 1 is a cross-sectional view schematically showing an example of an aluminum foil according to a suitable embodiment of the present invention.

As shown in FIG. 1, an aluminum foil 10 has an aluminum oxide film 14 having a thickness of 25 nm or less formed on both main surfaces of an aluminum substrate 3, and further has a hydrophilic layer 16 on the surface of the aluminum oxide film 14. The aluminum foil 10 has a plurality of through holes 5 penetrating the aluminum substrate 3 and the aluminum oxide film 14 in the thickness direction. That is, the aluminum foil 10 has a configuration in which the aluminum substrate 3 having through holes penetrating the aluminum substrate in the thickness direction and the aluminum oxide film 14 having through holes penetrating the aluminum oxide film in the thickness direction are laminated, and has a configuration in which the hydrophilic layer 16 is formed on the surface of the aluminum oxide film 14.

In the example shown in FIG. 1, the hydrophilic layer 16 is formed on the main surface (maximum surface) of the aluminum oxide film 14 and the inner wall portion of the through hole 5, but the present invention is not limited thereto. The hydrophilic layer 16 may be formed in at least a part thereof.

Further, in the example shown in FIG. 1, the aluminum oxide film 14 is formed on both main surfaces of the aluminum substrate 3, but the present invention is not limited thereto. The aluminum oxide film 14 may be formed only on one main surface.

The aluminum foil according to the embodiment of the present invention is used as a current collector and is used as a positive electrode or a negative electrode of a power storage device by applying an active material (electrode material) to the surface thereof.

In a case where the aluminum foil is used as a current collector by providing the plurality of through holes penetrating the aluminum foil in the thickness direction, it is possible to facilitate the movement of lithium ions. In addition, by providing a large number of through holes, the adhesiveness to the active material can be improved.

Here, in the present invention, the aluminum oxide film 14 having a thickness of 25 nm or less is formed of a non-porous oxide film alone or both a non-porous oxide film and a thin porous-shaped (porous) oxide film. Specifically, the aluminum oxide film 14 having a thickness of 25 nm or less is formed such that a non-porous oxide film having a thickness of 15 nm or less is provided alone, or a thin porous-shaped oxide film having a thickness of 10 nm or less is formed on a non-porous oxide film and a total thickness thereof is 25 nm or less.

In addition, in the present invention, the hydrophilic layer 16 is a layer having hydrophilicity, and is a layer for improving the hydrophilicity on the surface of the aluminum oxide film 14.

As described above, in a large capacity next-generation secondary battery, a large amount of Li ions are doped into an electrode in advance in order to secure a capacity in accordance with the material of the electrode material. As a method of doping Li ions, a method is known in which Li metal is put into a battery cell and dissolution in the battery cell is promoted, so that excess Li ions are spread to the electrode. The electrode material is originally a porous material that transmits Li ions. On the other hand, a metal foil is usually used as a current collector which serves as a support for the electrode material and also serves as a conductive plate for taking in and out of electricity during charging and discharging. The metal foil conducts electricity but not ions. Therefore, in order to spread Li ions to every corner of the electrode material in the battery cell, a perforated foil provided with a large number of through holes for allowing Li ions to pass through a metal foil is used.

In addition, the electrode material for the positive electrode in the next-generation secondary battery is prepared as an aqueous coating solution, and is applied to a perforated foil serving as a current collector. Therefore, it is desirable that the perforated foil for a positive electrode is hydrophilic.

Aluminum is known as a metal exhibiting hydrophilicity. Therefore, an aluminum foil is used as a current collector for the positive electrode.

However, in order to obtain further hydrophilicity with the electrode material for a positive electrode, it is not sufficient to use aluminum only as the material of the perforated foil serving as the current collector. Therefore, it is considered to provide a hydrophilic layer on the surface of the perforated foil. However, since the hydrophilic layer may cause electric resistance, in a case where the hydrophilic layer is simply provided, the conductivity between the electrode material and the perforated foil may be reduced.

For example, in a case where the thickness of the aluminum oxide film existing on the surface of the aluminum foil is more than 25 nm, the layer becomes a porous-shaped (porous) layer having a large number of pores, the hydrophilic layer enters the pores and a large amount of hydrophilic layer adheres to the aluminum oxide film. Thus, although the hydrophilicity is improved, the electric resistance is increased and the conductivity between the electrode material and the perforated foil is reduced.

In contrast, the aluminum foil 10 of the embodiment of the present invention has the aluminum oxide film 14 having a thickness of 25 nm or less on the surface, and further has the hydrophilic layer 16 on at least a part of the surface of the aluminum oxide film 14. By providing the hydrophilic layer 16, the affinity with the electrode material for a positive electrode can be increased. At this time, by setting the thickness of the aluminum oxide film on the surface to 25 nm or less, a layer having no pores can be formed, or a layer having pores is present but is very thin. Thus, it is possible to prevent a large amount of the hydrophilic layer 16 to adhere to the aluminum oxide film. Thereby, the electrical resistance between the aluminum foil 10 and the electrode material can be prevented from being increased, and the conductivity can be secured.

In addition, since the aluminum foil 10 has a high affinity with the electrode material, the electrode material enters the through hole 5, leading to high adhesiveness. High adhesiveness can reduce the contact resistance between the aluminum foil 10 and the electrode material. In addition, even in a case where charging and discharging are performed many times, the risk that the electrode material may be peeled off from the aluminum foil 10 (current collector) can be avoided, and excellent cycle characteristics can be obtained.

Here, in the aluminum foil of the embodiment of the present invention, the density of the aluminum oxide film 14 is preferably 2.7 to 4.1 $g/cm^3$, more preferably 2.7 to 4.1 $g/cm^3$, and even more preferably and 3.2 to 4.1 $g/cm^3$.

Since aluminum is easily oxidized and is oxidized in a case of being exposed to the atmosphere, aluminum is provided with an oxide film at all times. Since the oxide film has high insulating properties, in a case where a thick oxide film is present on the surface of the aluminum substrate, the electrical resistance between the aluminum substrate and the electrode material (active material) may be increased.

In contrast, since moisture can be prevented from permeating the oxide film and reaching the aluminum substrate by setting the film density of the aluminum oxide film to 2.7 to 4.1 $g/cm^3$, it is possible to suppress the progress of the oxidation of the aluminum substrate and suppress an increase in the thickness of the oxide film. Thus, a state in which the electric resistance is low can be stably maintained.

The film density of the aluminum oxide film is measured using a high resolution Rutherford backscattering spectrometry (RBS) HRBS500 (HR-RBS) manufactured by Kobe Steel, Ltd. $He^+$ ions with an energy of 450 keV are made incident on a sample at 62.5 degrees with respect to the normal of the sample surface (the surface of the aluminum oxide film of the aluminum foil), and the scattered $He^+$ ions are deflected at a position of a scattering angle of 55 degrees with a deflecting magnetic field type field energy analyzer to obtain areal density. The obtained areal density ($atoms/cm^2$) is converted into a mass areal density ($g/cm^2$), and the density of the aluminum oxide film ($g/cm^3$) is calculated from this value and the film thickness measured by a transmission electron microscope (TEM).

In addition, from the viewpoint that the electrical resistance between the aluminum foil and the electrode material can be reduced, the thickness of the aluminum oxide film 14 is preferably 1 nm to 25 nm, more preferably 1 nm to 15 nm, and even more preferably 1 nm to 8 nm.

The film thickness of the non-porous oxide film is obtained by observing the cross section with a transmission electron microscope (TEM), measuring the film thickness at three places, and calculating an average value as the film thickness.

In addition, the average opening diameter of the through holes is preferably 1 μm or more and less than 500 μm, more preferably more than 1 μm and 100 μm or less, even more preferably more than 1 μm and 80 μm or less, particularly preferably 3 μm or more and 40 μm or less, and most preferably 5 μm or more and 30 μm or less.

By setting the average opening diameter of the through holes in the above range, it is possible to prevent the occurrence of strike-through of the coating solution in a case of applying the electrode material to the aluminum foil and to improve the adhesiveness with the applied electrode material active material. In addition, even in a case where the aluminum foil has a large number of through holes, the aluminum foil can have a sufficient tensile strength.

The average opening diameter of the through holes is obtained by capturing an image of the surface of the aluminum foil using a high resolution scanning electron microscope (SEM) at a magnification of 200 times from one surface of the aluminum foil, extracting at least 20 through holes having a circumference that continues in a ring shape from the obtained SEM image, scanning the opening diameters thereof, and calculating the average value thereof as the average opening diameter.

In addition, the maximum value of a distance between the end portions of the through hole portion is measured as the opening diameter. That is, since the shape of the opening portion of the through hole is not limited to a substantially circular shape, in a case where the shape of the opening portion is non-circular, the maximum value of the distance between the end portions of the through hole portion is defined as the opening diameter. Therefore, for example, even in a case of through holes formed having such a shape that two or more through holes are integrated, this through hole is regarded as one through hole, and the maximum value of the distance between the end portions of the through hole portion is defined as the opening diameter.

In addition, as the hole density (number density) of the through holes increases, the pre-doping characteristics and the adhesiveness are improved. On the other hand, as the hole density decreases, the tensile strength is improved. Therefore, from the viewpoint of pre-doping characteristics, adhesiveness, tensile strength, and the like, the hole density is preferably 1 to 1000 $holes/mm^2$, more preferably 3 to 900 $holes/mm^2$, and even more preferably 100 to 200 $holes/mm^2$.

For the hole density (number density) of the through holes, a parallel light optical unit is installed on one main surface side of the aluminum foil, the parallel light is transmitted, and an image of the surface of the aluminum foil is captured from the other main surface of the aluminum foil using an optical microscope at a magnification of 100 times to obtain the image. In a range of 10 cm×10 cm of the obtained image, the number of through holes is measured at five places of a visual field of 100 mm×75 mm, the measured values are converted into the numbers per $mm^2$, and the average value of the values in each visual field (five places) is calculated as the hole density of the through holes.

The thickness of the aluminum foil is not particularly limited, but is preferably 5 μm to 100 μm and more preferably 10 μm to 30 μm.

<Aluminum Substrate>

The aluminum substrate is not particularly limited, and for example, a well-known aluminum substrate such as alloy number 1085, 1N30, or 3003 described in JIS standard H4000 can be used. The aluminum substrate is an alloy plate containing aluminum as a main component and containing a trace amount of a different element.

<Aluminum Oxide Film Having Thickness of 25 nm or Less>

It is preferable that the aluminum oxide film having a thickness of 25 nm or less is an oxide film formed of a non-porous oxide film having a thickness of 15 nm or less alone, or an oxide film formed of both a non-porous oxide film and a thin porous-shaped (porous) oxide film, and a layer containing an aluminum oxide such as aluminum oxide ($Al_2O_3$).

Here, the aluminum oxide can exist as a hydrate of aluminum such as aluminum oxide monohydrate ($Al_2O_3 \cdot 1H_2O$) and aluminum oxide trihydrate ($Al_2O_3 \cdot 3H_2O$).

Therefore, it is preferable that the aluminum oxide film having a thickness of 25 nm or less is a layer containing at least one of aluminum oxide ($Al_2O_3$), aluminum oxide monohydrate ($Al_2O_3 \cdot 1H_2O$), or aluminum oxide trihydrate ($Al_2O_3 \cdot 3H_2O$).

Such an aluminum oxide film having a thickness of 25 nm or less is formed by a natural oxide film formed under a low humidity condition as much as possible.

As described in WO2016/158245A, as a method of forming fine through holes in an aluminum foil, a method of forming through holes by carrying out an electrolytic dissolution treatment on an aluminum substrate is known. In a case of carrying out such an electrolytic dissolution treatment, an aluminum hydroxide film is formed on the surface of the aluminum substrate. Therefore, in a case where the aluminum substrate after the electrolytic dissolution treatment is dried, a thick aluminum oxide film is formed on the surface thereof. Therefore, the electric resistance increases.

On the other hand, as will be described later in detail, an aluminum oxide film having a thickness of 25 nm or less can be suitably formed by removing the aluminum hydroxide film formed during the electrolytic dissolution treatment for forming the through holes, and then forming an aluminum oxide film on the surface of the aluminum substrate.

As described above, the density of the aluminum oxide film having a thickness of 25 nm or less is preferably 2.7 to 4.1 $g/cm^3$.

The density of aluminum oxide ($Al_2O_3$) is about 4.1 $g/cm^3$, the density of aluminum oxide monohydrate ($Al_2O_3 \cdot 1H_2O$) is about 3.07 $g/cm^3$, and the density of aluminum oxide trihydrate ($Al_2O_3 \cdot 3H_2O$) is about 2.42 $g/cm^3$.

Therefore, as the ratio of the hydrate decreases, the density of the aluminum oxide film having a thickness of 25 nm or less increases. For example, in a case where the density of the aluminum oxide film having a thickness of 25 nm or less is less than 3.95 $g/cm^3$, the aluminum oxide film having a thickness of 25 nm or less contains 3% or more of hydrate.

From the viewpoint of forming an aluminum oxide film having high density and a thickness of 25 nm or less, the amount of aluminum oxide ($Al_2O_3$) in the aluminum oxide film is preferably 70% or more, more preferably 80% or more, and even more preferably 90% or more.

In addition, the amount of aluminum oxide monohydrate ($Al_2O_3 \cdot 1H_2O$) and aluminum oxide trihydrate ($Al_2O_3 \cdot 3H_2O$) contained in the aluminum oxide film having a thickness of 25 nm or less is preferably 45% or less, more preferably 30% or less, and even more preferably 15% or less.

<Hydrophilic Layer>

It is preferable that the hydrophilic layer is a layer that imparts hydrophilicity to the surface of the aluminum foil and is a layer containing a hydrophilic component.

Here, the hydrophilic component refers to a component that can improve the hydrophilicity of the surface by being present on the surface of the aluminum foil, as compared with a case where the component is not present on the surface of the aluminum foil.

Suitable examples of the hydrophilic component include compounds having at least one structure selected from the group consisting of silicate, phosphate, sulfonic acid, sulfonate, phosphonic acid, phosphonate, phosphate ester, phosphate ester salt, and fluorinated zirconic acid may be suitably used, and among these, compounds having at least one structure selected from the group consisting of silicate, phosphate ester and phosphate ester salt are preferable.

Specific examples of the hydrophilic layer include a hydrophilic layer formed by a hydrophilization treatment with an aqueous sodium silicate solution, and a hydrophilic layer formed by a hydrophilization treatment with polyvinyl phosphonic acid described in JP3318031B, a hydrophilic layer formed by immersion in a mixed liquid of a sodium fluoride zirconate solution and a sodium hydrogen phosphate solution, a hydrophilic layer formed by applying a coating solution containing a colloid of oxide or hydroxide of at least one element selected from beryllium, magnesium, aluminum, silicon, titanium, boron, germanium, tin, zirconium, iron, vanadium, antimony and a transition metal described in JP2001-199175A, a hydrophilic layer having an organic hydrophilic matrix obtained by crosslinking or pseudo-crosslinking an organic hydrophilic polymer described in JP2002-079772A, a hydrophilic layer having an inorganic hydrophilic matrix obtained by sol-gel conversion including hydrolysis and condensation reaction of poly-alkoxysilane, titanate, zirconate or aluminate, and a hydrophilic layer formed of an inorganic thin layer having a surface containing metal oxide.

The hydrophilization treatment with an aqueous sodium silicate solution is desirable for industrial production since water washing and a waste liquid treatment are easy.

The thickness of the hydrophilic layer is preferably 0.1 nm to 5 nm, more preferably 0.2 nm to 3 nm, and even more preferably 0.3 nm to 1 nm.

The thickness of the hydrophilic layer can be measured by etching electron spectroscopy for chemical analysis (ESCA).

The hydrophilic layer can be formed by dissolving or dispersing each of the above components in water or a mixed solvent of water and an organic solvent to prepare a liquid for a hydrophilic layer, and applying the solution for a hydrophilic layer to the surface of the aluminum substrate having an aluminum oxide film having a thickness of 25 nm or less by a known method such as coating and immersion. As a coating method, various known methods can be used. Examples thereof include bar coater coating, spin coating, spray coating, curtain coating, dip coating, air knife coating, blade coating, and roll coating.

[Method of Producing Aluminum Foil]

Next, a method of producing the aluminum foil according to the embodiment of the present invention will be described.

The method for producing the aluminum foil according to the embodiment of the present invention preferably includes
a step of forming through holes in an aluminum substrate,
a step of forming an aluminum oxide film having a thickness of 25 nm or less on the aluminum substrate in which the through holes are formed, and
a step of forming a hydrophilic layer on the surface of the aluminum substrate on which the aluminum oxide film having a thickness of 25 nm or less is formed.

Hereinafter, a suitable example of the method of producing the aluminum foil will be described.

The method of producing the aluminum foil preferably includes
a film forming step of carrying out an electrolytic treatment in a first acidic aqueous solution using an aluminum substrate as a cathode to form an aluminum hydroxide film on a surface of the aluminum substrate,
a through hole forming step of carrying out an electrolytic treatment in a second acidic aqueous solution using the aluminum substrate as an anode and carrying out a through hole forming treatment on the aluminum substrate and the aluminum hydroxide film to form through holes,
a film removing step of immersing the aluminum substrate after the film forming step in an alkaline aqueous solution to remove the aluminum hydroxide film, and
an oxide film forming step of forming an aluminum oxide film having a thickness of 25 nm or less on the surface of the aluminum substrate by natural oxidation after the film removing step, and
a hydrophilic layer forming step of forming a hydrophilic layer on the surface of the aluminum oxide film.

By the oxide film forming step, an aluminum oxide film having a thickness of 25 nm or less is formed on the aluminum substrate.

In addition, by the film removing step, the aluminum substrate is exposed by removing an unnecessary film, oil, or the like to facilitate the formation of the aluminum oxide film having a thickness of 25 nm or less by natural oxidation.

Further, it is preferable to provide a water washing step of carrying out a water washing treatment after the completion of each of the film forming step, the through hole forming step, the film removing step, the oxide film forming step, and the hydrophilic layer forming step.

In addition, it is preferable to provide a drying step of carrying out a drying treatment after the final water washing treatment.

Hereinafter, each step of the method of producing the aluminum foil will be described with reference to FIGS. 2 to 5, and then each step will be described in detail.

FIGS. 2 to 5 are schematic cross-sectional views showing an example of a suitable embodiment of the method of producing the aluminum foil.

Figure 6:
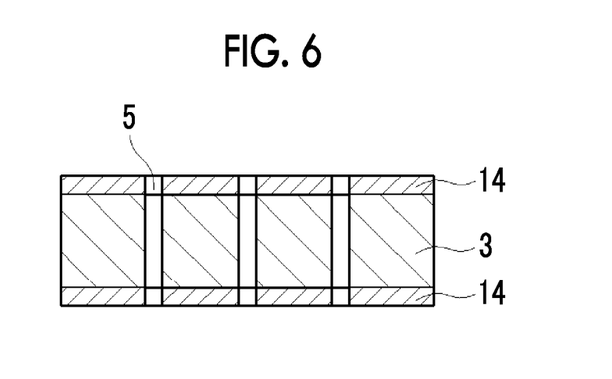
FIG. 6 is a schematic cross-sectional view for describing the example of the suitable method of producing the aluminum foil of the present invention.

As shown in FIGS. 2 to 5, the method of producing the aluminum foil is a production method including a film forming step of carrying out a film forming treatment on both main surfaces of an aluminum substrate 1 to form an aluminum hydroxide film 2 (FIGS. 2 and 3), a through hole forming step of forming through holes 5 by carrying out an electrolytic dissolution treatment after the film forming step, thereby forming an aluminum substrate 3 having the through holes and an aluminum hydroxide film 4 having the through holes (FIGS. 3 and 4), a film removing step of removing the aluminum hydroxide film 4 having the through holes after the through hole forming step to prepare the aluminum substrate 3 having the through holes (FIGS. 4 and 5), an oxide film forming step of forming an aluminum oxide film 14 having a thickness of 25 nm or less on both main surfaces of the aluminum substrate 3 having the through holes by natural oxidation (FIGS. 5 and 6), and a hydrophilic layer forming step of forming a hydrophilic layer 16 on the surface after the oxide film forming step (FIGS. 6 and 1).

[Film Forming Step]

The film forming step is a step of carrying out an electrolytic treatment (film forming treatment) in a first acidic aqueous solution using an aluminum substrate as a cathode to form an aluminum hydroxide film on a surface of the aluminum substrate.

<Film Forming Treatment>

The above film forming treatment is not particularly limited, and for example, it is possible to carry out the same treatment as a well-known aluminum hydroxide film forming treatment of the related art.

As the film forming treatment, it is possible to appropriately employ, for example, conditions or devices described in paragraphs [0013] to [0026] of JP2011-201123A.

In the present invention, the conditions of the film forming treatment vary in diverse manners depending on electrolytic solutions being used and thus cannot be determined uniformly. However, generally, the concentration of an electrolytic solution in a range of 1% to 80% by mass, the liquid temperature in a range of 5° C. to 70° C., the current density in a range of 0.5 to 60 A/dm$^2$, the voltage in a range of 1 to 100 V, and the electrolysis duration in a range of 1 second to 20 minutes are appropriate and are adjusted so as to obtain a desired amount of film.

In the present invention, an electrochemical treatment is preferably carried out using nitric acid, hydrochloric acid, sulfuric acid, phosphoric acid, oxalic acid, or a mixed acid of two or more of these acids as an electrolytic solution (first acidic aqueous solution).

In a case where the electrochemical treatment is carried out in an electrolytic solution containing nitric acid and hydrochloric acid, a direct current may be applied between the aluminum substrate and the counter electrode, or an alternating current may be applied. In a case where a direct current is applied to the aluminum substrate, the current density is preferably 1 to 60 A/dm$^2$, and more preferably 5 to 50 A/dm$^2$. In a case where the electrochemical treatment is continuously carried out, it is preferable to carry out the electrochemical treatment by a liquid power feeding method in which power is fed to the aluminum substrate through an electrolytic solution.

In the present invention, the amount of the aluminum hydroxide film being formed by the film forming treatment is preferably 0.05 to 50 g/m$^2$ and more preferably in a range of 0.1 to 10 g/m$^2$.

[Through Hole Forming Step]

The through hole forming step is a step of carrying out an electrolytic treatment (electrolytic dissolution treatment) in a second acidic aqueous solution using the aluminum substrate as an anode after the film forming step to form through holes in the aluminum substrate and the aluminum hydroxide film.

<Electrolytic Dissolution Treatment>

The above electrolytic dissolution treatment is not particularly limited, and it is possible to use direct current or alternating current and use an acidic solution (second acidic aqueous solution) as an electrolytic solution. Among these, the electrochemical treatment is preferably carried out using at least one acid of nitric acid and hydrochloric acid, and the electrochemical treatment is more preferably carried out using a mixed acid of at least one of sulfuric acid, phosphoric acid, or oxalic acid in addition to the above-described acids.

In the present invention, as the acidic solution which is the electrolytic solution, it is possible to use, in addition to the above-described acids, electrolytic solutions described in the respective specifications of U.S. Pat. Nos. 4,671,859A, 4,661,219A, 4,618,405A, 4,600,482A, 4,566,960A, 4,566,958A, 4,566,959A, 4,416,972A, 4,374,710A, 4,336,113A, and 4,184,932A.

The concentration of the acidic solution is preferably 0.1% to 2.5% by mass, and particularly preferably 0.2% to 2.0% by mass. In addition, the liquid temperature of the acidic solution is preferably 20° C. to 80° C. and more preferably 30° C. to 60° C.

In addition, as an aqueous solution including the above-described acid as a main body, it is possible to use an aqueous solution obtained by adding at least one nitric acid compound having nitric acid ions such as aluminum nitrate, sodium nitrate, or ammonium nitrate, a hydrochloric acid compound having hydrochloric acid ions such as aluminum chloride, sodium chloride, or ammonium chloride, or a sulfuric acid compound having sulfuric acid ions such as aluminum sulfate, sodium sulfate, or ammonium sulfate to an aqueous solution of an acid which has a concentration of 1 to 100 g/L in a range of 1 g/L to saturation.

In addition, in the aqueous solution including the above-described acid as the main body, metals which are included in an aluminum alloy, such as iron, copper, manganese, nickel, titanium, magnesium, and silica may be dissolved. A liquid obtained by adding aluminum chloride, aluminum nitrate, aluminum sulfate, or the like to an aqueous solution of an acid having a concentration in a range of 0.1% to 2% by mass so that the concentration of aluminum ions falls in a range of 1 to 100 g/L is preferably used.

In the electrochemical dissolution treatment, a direct current is mainly used. However, in a case in which an alternating current is used, the alternating current power source wave is not particularly limited, and a sine wave, a square wave, a trapezoidal wave, a triangular wave, and the like can be used.

(Nitric Acid Electrolysis)

In the present invention, it is possible to easily form through holes which have an average opening diameter of 0.1 μm or more and less than 100 μm by an electrochemical dissolution treatment in which an electrolytic solution including nitric acid as a main body is used (hereinafter, also abbreviated as "nitric acid dissolution treatment").

Here, the nitric acid dissolution treatment is preferably an electrolytic treatment which is carried out using a direct current under conditions of an average current density set to 5 A/dm$^2$ or higher and a quantity of electricity set to 50 C/dm$^2$ or more since it is easy to control dissolution points of through hole formation. The average current density is preferably 100 A/dm$^2$ or less, and the quantity of electricity is preferably 10000 C/dm$^2$ or less.

In addition, the concentration or temperature of the electrolytic solution in the nitric acid electrolysis is not particularly limited, and it is possible to carry out electrolysis using a nitric acid electrolytic solution having a high concentration, for example, a nitric acid concentration of 15% to 35% by mass at 30° C. to 60° C. or carry out electrolysis using a nitric acid electrolytic solution having a nitric acid concentration of 0.7% to 2% by mass at a temperature of 30° C. to 80° C.

In addition, it is possible to carry out electrolysis using an electrolytic solution obtained by mixing at least one of sulfuric acid, oxalic acid, or phosphoric acid having a concentration of 0.1% to 50% by mass into the above-described nitric acid electrolytic solution.

(Hydrochloric Acid Electrolysis)

In the present invention, it is also possible to easily form through holes which have an average opening diameter of 1 μm or more and less than 100 μm by an electrochemical dissolution treatment in which an electrolytic solution including hydrochloric acid as a main body is used (hereinafter, also abbreviated as "hydrochloric acid dissolution treatment").

Here, the hydrochloric acid dissolution treatment is preferably an electrolytic treatment which is carried out using a direct current under conditions of an average current density set to 5 A/dm$^2$ or higher and a quantity of electricity set to 50 C/dm$^2$ or more since it is easy to control dissolution points of through hole formation. The average current density is preferably 100 A/dm$^2$ or less, and the quantity of electricity is preferably 10000 C/dm$^2$ or less.

In addition, the concentration or temperature of the electrolytic solution in the hydrochloric acid electrolysis is not particularly limited, and it is possible to carry out electrolysis using a hydrochloric acid electrolytic solution having a high concentration, for example, a hydrochloric acid concentration of 10% to 35% by mass at 30° C. to 60° C. or carry out electrolysis using a hydrochloric acid electrolytic solution having a hydrochloric acid concentration of 0.7% to 2% by mass at a temperature of 30° C. to 80° C.

In addition, it is possible to carry out electrolysis using an electrolytic solution obtained by mixing at least one of sulfuric acid, oxalic acid, or phosphoric acid having a concentration of 0.1% to 50% by mass into the above-described hydrochloric acid electrolytic solution.

[Film Removing Step]

The film removing step is a step of carrying out a chemical dissolution treatment to remove the aluminum hydroxide film.

The film removing step is capable of removing the aluminum hydroxide film by, for example, carrying out an acid etching treatment or an alkali etching treatment described below.

<Alkali Etching Treatment>

The alkali etching treatment is a treatment in which the surface layer is dissolved by bringing the aluminum hydroxide film into contact with an alkaline solution.

Examples of the alkalis that can be used in the alkaline solution include caustic alkalis and alkali metal salts. Specific examples of caustic alkalis include sodium hydroxide (caustic soda) and caustic potash. In addition, examples of alkali metal salts include alkali metal silicates such as sodium metasilicate, sodium silicate, potassium metasilicate, and potassium silicate; alkali metal carbonates such as sodium carbonate and potassium carbonate; alkali metal aluminate such as sodium aluminate and potassium aluminate; alkali metal aldonates such as sodium gluconate and potassium gluconate; and alkali metal hydrogenphosphate such as sodium diphosphate, potassium diphosphate, sodium triphosphate, and potassium triphosphate. Among these, solutions of caustic alkalis and solutions containing both caustic alkali and alkali metal aluminate are preferred from the viewpoint of the fast etching rates and the cheap prices. Particularly, an aqueous sodium hydroxide solution is preferable.

The concentration of the alkaline solution is preferably 0.1% to 50% by mass and more preferably 0.2% to 10% by mass. In a case where the alkaline solution has aluminum ions dissolved therein, the concentration of aluminum ions is preferably 0.01% to 10% by mass and more preferably from 0.1% to 3% by mass. The temperature of the alkaline solution is preferably 10° C. to 90° C. The treatment time is preferably 1 to 120 seconds.

Examples of a method for bringing the aluminum hydroxide film into contact with the alkaline solution include a method in which the aluminum substrate on which the aluminum hydroxide film is formed is allowed to pass through a tank containing the alkaline solution, a method in which the aluminum substrate on which the aluminum hydroxide film is formed is dipped into a tank containing the alkaline solution, and a method in which the alkaline solution is sprayed to the surface (aluminum hydroxide film) of the aluminum substrate on which the aluminum hydroxide film is formed.

<Acid Etching Treatment>

The acid etching treatment is carried out to completely remove a residue remaining on the surface after the alkali etching treatment. At the same time, in order to eliminate the possibility that an unnecessarily thick oxide film may be formed in the oxide film forming treatment carried out later, it is also necessary that a residue hardly remains after the acid etching treatment.

Here, for example, the acidic solution is preferably an aqueous solution containing at least one selected from a group consisting of nitric acid, hydrochloric acid, sulfuric acid, phosphoric acid, oxalic acid, chromium compounds, zirconium-based compounds, titanium-based compounds, lithium salts, cerium salts, magnesium salts, sodium silicofluoride, zinc fluoride, manganese compounds, molybdenum compounds, magnesium compounds, barium compounds, and halogen single bodies.

Specific examples of the chromium compounds include chromium (III) oxide, and anhydrous chromium (VI) acid.

Examples of the zirconium-based compounds include ammonium fluorozirconate, zirconium fluoride, and zirconium chloride.

Examples of the titanium-based compounds include titanium oxide and titanium sulfide.

Examples of the lithium salts include lithium fluoride and lithium chloride.

Examples of the cerium salts include cerium fluoride and cerium chloride.

Examples of the magnesium salts include magnesium sulfide.

Examples of the manganese compounds include sodium permanganate and calcium permanganate.

Examples of the molybdenum compounds include sodium molybdate.

Examples of the magnesium compounds include magnesium fluoride-pentahydrate.

Examples of the barium compounds include barium oxide, barium acetate, barium carbonate, barium chlorate, barium chloride, barium fluoride, barium iodide, barium lactate, barium oxalate, barium perchlorate, barium selenate, barium selenite, barium stearate, barium sulfite, barium titanate, barium hydroxide, barium nitrate, and hydrates thereof.

Among the above barium compounds, barium oxide, barium acetate, and barium carbonate are preferable, and barium oxide is particularly preferable.

Examples of the halogen single bodies include chlorine, fluorine, and bromine.

Among these, the aluminum hydroxide dissolution liquid is preferably an aqueous solution containing the following acid, examples of the acid include nitric acid, hydrochloric acid, sulfuric acid, phosphoric acid, oxalic acid, and the like, and the acid may be a mixture of two or more acids.

The acid concentration is preferably 0.01 mol/L or more, more preferably 0.05 mol/L or more, and even more preferably 0.1 mol/L or more. Although the upper limit is not particularly limited, the upper limit is generally preferably 10 mol/L or less and more preferably 5 mol/L or less.

The dissolution treatment is carried out by bringing the aluminum substrate on which the aluminum hydroxide film is formed into contact with the above-described dissolution solution. The contact method is not particularly limited, and examples thereof include a dipping method and a spraying method. Among these, the spraying method is preferable. After the acid etching treatment, it is preferable to carry out sufficient water washing.

[Oxide Film Forming Step]

The oxide film forming step is a step of forming an aluminum oxide film having a thickness of 25 nm or less on both main surfaces of the aluminum substrate by naturally oxidizing the surface of the aluminum substrate from which the aluminum hydroxide film has been removed.

As described above, an aluminum oxide film having a thickness of 25 nm or less can be suitably formed by removing the aluminum hydroxide film formed on the surface of the aluminum substrate during the electrolytic dissolution treatment for forming the through holes by the alkali etching treatment, further removing the residue by the acid etching treatment, and then forming an oxide film on the surface of the aluminum substrate by natural oxidation or the like.

Regarding the thickness, density, and the like of the aluminum oxide film, the thickness and the like of the aluminum oxide film formed on the aluminum surface can be changed by changing the storage method of the aluminum substrate after the film removing step. Specifically, the thickness and the like of the aluminum oxide film can be changed by changing the temperature, humidity, storage time, and the like.

(Hydrophilic Layer Forming Step)

The hydrophilic layer forming step is a step of forming a hydrophilic layer on the surface of the aluminum oxide film having a thickness of 25 nm or less.

As described above, the hydrophilic layer can be formed by dissolving or dispersing a compound or the like serving as the hydrophilic layer in water or a mixed solvent of water and an organic solvent to prepare a liquid for a hydrophilic layer, and applying the liquid for a hydrophilic layer to the surface of the aluminum substrate having an aluminum oxide film by a well-known method such as coating and immersion.

[Water Washing Step]

As described above, in the present invention, it is preferable to provide a water washing step of carrying out a water washing treatment after the completion of each of the film forming step, the through hole forming step, the film removing step, the oxide film forming step, and the hydrophilic layer forming step described above. In the water washing, it is possible to use pure water, well water, tap water, or the like. In order to prevent the treatment liquids from being carried to the subsequent steps, a nipping device may be used.

[Drying Step]

As described above, a drying treatment may be provided after the water washing step after each step.

The drying method is not particularly limited and well-known drying methods such as a method of blowing off moisture with an air knife or the like, a method by heating, and the like can be appropriately used. In addition, a plurality of drying methods may be carried out.

In the above-described example, the through holes are formed in the aluminum substrate by carrying out the film forming step, the through hole forming step, and the film removing step, but the present invention is not limited thereto. The through holes may be formed using other well-known methods.

For example, the through holes can be formed by applying lithography to a resist material after applying the resist material to the surface of the aluminum substrate and then carrying out etching processing. Alternatively, there is a method in which the aluminum substrate is brought into contact with an etchant to locally dissolve starting from an intermetallic compound (precipitate or crystallized substance) in the aluminum substance to form through holes. In the case of this method, since the presence state of the intermetallic compound differs depending on each material of the aluminum substrate, conditions may be determined in advance for each material, and conditions such as an etchant condition, etching time, and the like may be adjusted.

In addition, the through hole can be formed by a machining method by physical contact such as punching and needle processing.

[Current Collector]

As described above, the aluminum foil according to the embodiment of the present invention can be used as an aluminum member for electrodes and also can be used as a current collector for a power storage device (hereinafter, also referred to as "current collector").

Since the aluminum foil has a plurality of through holes in the thickness direction in the current collector, for example, in a case of using the current collector for a lithium ion capacitor, pre-doping of lithium can be carried out in a short period of time, and lithium can be more uniformly dispersed. In addition, the adhesiveness to the active material layer and the activated carbon is improved, and a power storage device having excellent productivity such as cycle characteristics, output characteristics, and coating suitability can be prepared. In addition, since the current collector using the aluminum foil of the embodiment of the present invention has the hydrophilic layer, the adhesiveness to the active material layer (electrode material) is improved. Thus, peeling can be suppressed, and excellent cycle characteristics can be obtained. On the other hand, since the hydrophilic layer is formed on the surface of the thin aluminum oxide film, an increase in electric resistance with the active material layer can be suppressed, and an efficient power storage device can be prepared.

<Active Material Layer>

The active material layer is not particularly limited, and it is possible to use well-known active material layers that are used in storage devices of the related art.

Specifically, regarding conductive materials, binders, solvents, and the like that may be contained in the active material and the active material layer in a case in which the aluminum foil is used as a current collector for positive electrodes, it is possible to appropriately employ materials described in paragraphs [0077] to [0088] of JP2012-216513A, the content of which is incorporated into the present specification by reference.

In addition, regarding the active materials in a case in which the aluminum foil is used as a current collector for negative electrodes, it is possible to appropriately employ materials described in paragraph [0089] of JP2012-216513A, the content of which is incorporated into the present specification by reference.

[Storage Device]

Electrodes in which the aluminum foil according to the embodiment of the present invention is used as a current collector can be used as positive electrodes or negative electrodes in power storage devices.

Here, regarding the specific constitution or applications of storage devices (particularly, secondary batteries), it is possible to appropriately employ materials or applications described in paragraphs [0090] to [0123] of JP2012-216513A, the content of which is incorporated into the present specification by reference.

[Positive Electrode]

The positive electrode in which the aluminum foil according to the embodiment of the present invention is used as a current collector is a positive electrode having a positive electrode current collector in which the aluminum foil is used for a positive electrode and a layer including a positive electrode active material that is formed on the surface of the positive electrode current collector (positive electrode active material layer).

Here, regarding the positive electrode active material, a conductive material, a binder, a solvent, and the like that may be contained in the positive electrode active material layer, it is possible to appropriately employ materials described in paragraphs [0077] to [0088] of JP2012-216513A, the content of which is incorporated into the present specification by reference.

[Negative Electrode]

The negative electrode in which the aluminum foil according to the embodiment of the present invention is used as a current collector is a negative electrode having a negative electrode current collector in which the aluminum foil is used for a negative electrode and a layer including a negative electrode active material that is formed on the surface of the negative electrode current collector.

Here, regarding the negative electrode active material, it is possible to appropriately employ materials described in paragraph [0089] of JP2012-216513A, the content of which is incorporated into the present specification by reference.

[Other Applications]

The aluminum foil according to the embodiment of the present invention can be used not only as a current collector for a power storage device but also as an aluminum member for electrodes for an electrolytic condenser.

EXAMPLES

Hereinafter, the present invention will be described in more detail based on examples. The materials, amounts used, ratios, treatment details, treatment procedures, and the like shown in the following examples can be changed as appropriate without departing from the spirit of the present invention. Therefore, the scope of the present invention should not be construed as being limited by the following examples.

Example 1

<Preparation of Aluminum Foil>
(Formation of Through Hole)

With reference to Example 1 of JP2011-208254A, the conditions were adjusted as follows, and through holes were formed in an aluminum substrate by an electrolytic method.

An ingot having an aluminum purity of 99.99% was prepared, and a homogenization treatment, hot rolling (temperature: 400° C.), cold rolling, intermediate annealing, and cold rolling again were carried out to obtain an aluminum substrate having a thickness of 30 μm. After cleaning the surface, annealing was performed at 500° C. for 10 hours in argon gas. By this annealing, the crystal orientation of aluminum can be aligned in the substantially same direction. Then, by carrying out a direct current etching was carried out using an aqueous solution containing 5% by mass of hydrochloric acid as an electrolytic solution, tunnel pits were formed and caused to penetrate the aluminum substrate to form through holes having an average opening diameter of 1 μm and a hole density of 900 holes/mm$^2$.

In addition, the average opening diameter and the pore density were measured by the methods described above.

(Formation of Oxide Film (Oxide Film Forming Step))

Next, the aluminum substrate on which the through holes were formed was stored at a temperature of 25° C. and a humidity of 7% RH for 3 months and naturally oxidized to form an aluminum oxide film.

The thickness of the formed aluminum oxide film was 5 nm as measured by the method described above.

(Formation of Hydrophilic Layer (Hydrophilic Layer Forming Step))

Next, the aluminum substrate on which the aluminum oxide film was formed was immersed in an aqueous sodium silicate solution at 60° C. for 5 seconds to form a hydrophilic layer, and then washed with water for 20 seconds to prepare an aluminum foil. As the aqueous sodium silicate solution, an aqueous sodium silicate solution No. 1 (JIS K 1408-1966) having a concentration of 5% was used.

After the formation of the hydrophilic layer, the amount of silicon adhered (Si adhesion amount), which is a constituent element of the hydrophilic layer, was measured. Regarding the amount of Si adhered, a calibration curve is created based on the measurement result of the material for which the amount of Si has been determined in advance using a fluorescent X-ray analyzer (XRF), and the amount of Si adhered can be weighed based on the calibration curve.

Example 2

An aluminum foil was prepared in the same manner as in Example 1 except that the method of forming the through holes was changed as follows, the average opening diameter of the through holes was 11 μm, and the hole density was 110 holes/mm$^2$.

(a) Aluminum Hydroxide Film Forming Treatment (Film Forming Step)

An aluminum substrate having an average thickness of 20 μm (JIS H-4160, alloy number: 1N30-H, aluminum purity: 99.30%) was prepared.

An electrolytic treatment was carried out under a condition of a sum of quantities of electricity of 500 C/dm$^2$ using an electrolytic solution (nitric acid concentration: 1%, sulfuric acid concentration: 0.2%, aluminum concentration: 0.5%) which was held at 50° C. and the above-described aluminum substrate as a cathode, thereby forming an aluminum hydroxide film on the aluminum substrate. Meanwhile, the electrolytic treatment was carried out using a direct current power supply. The current density was set to 50 A/dm$^2$.

After the formation of the aluminum hydroxide film, the aluminum hydroxide film was washed with water by spraying.

(b) Electrolytic Dissolution Treatment (Through Hole Forming Step)

Next, an electrolytic treatment was carried out under a condition of a sum of quantities of electricity of 500 C/dm$^2$ using an electrolytic solution (nitric acid concentration: 1%, sulfuric acid concentration: 0.2%, aluminum concentration: 0.5%) which was held at 50° C. and the aluminum substrate as an anode, and thus through holes were formed in the aluminum substrate and the aluminum hydroxide film. Meanwhile, the electrolytic treatment was carried out using a direct current power supply. The current density was set to 25 A/dm$^2$.

After the formation of the through holes, the aluminum substrate and the aluminum hydroxide film were washed with water by spraying.

(c) Aluminum Hydroxide Film Removing Treatment (Film Removing Step)

Next, the aluminum substrate after the electrolytic dissolution treatment was immersed in an aqueous solution (liquid temperature: 35° C.) having a sodium hydroxide concentration of 5% by mass and an aluminum ion concentration of 0.5% by mass for 30 seconds, and then washed with water. The aluminum substrate was immersed in an aqueous solution (liquid temperature: 50° C.) having a concentration of 30% and an aluminum ion concentration of 0.5% by mass for 20 seconds to remove an alkali etching residue.

Thereafter, the aluminum substrate was washed with water by spraying and dried to form through holes in the aluminum substrate.

Example 3

An aluminum foil was prepared in the same manner as in Example 2 except that the total amount of electricity in (a) film forming step above was changed to 1000 C/dm$^2$ and the total amount of electricity in (b) through hole forming step above was changed to 1000 C/dm$^2$, the average opening diameter of the through holes was set to 20 μm, and the hole density was set to 160 holes/mm$^2$.

Example 4

An aluminum foil was produced in the same manner as in Example 1 except that the method of forming the through holes was changed as follows, the average opening diameter of the through holes was set to 90 μm and the hole density was set to 8 holes/mm$^2$.

With reference to Comparative Example 1 described in WO2016/060037A, a resist was applied to the aluminum substrate, exposed, and then etched to form through holes.

An aluminum substrate having an average thickness of 20 μm (JIS H-4160, alloy number: 1N30-H, aluminum purity: 99.30%) was prepared.

A negative resist solution (manufactured by Shinwa Kogyo Co., Ltd., EF-100) was uniformly applied to both main surfaces of the aluminum substrate with a bar coater at a thickness of 10 μm and dried at 80° C. for 10 minutes. Subsequently, a negative film mask (150 μm) in which eight circles having a diameter of 80 μm per 1 mm$^2$ were formed was prepared. The negative film was vacuum-adhered to one side of the aluminum substrate on which the resist was laminated, and ultraviolet rays at 300 mJ/cm² were emitted from an ultraviolet exposing machine provided at a certain distance from the negative film to form a latent image on the resist layer. On the other hand, the other surface, which is different from the surface on which a negative film mask was formed and adhered, was exposed to ultraviolet rays of 300 mJ/cm² without interposing the negative film mask. Subsequently, unexposed portions were removed by development with a 1% aqueous sodium carbonate solution for 1 minute at 30° C.

Subsequently, the exposed aluminum surface after development was removed by etching. Specifically, a shower treatment was performed with an aqueous solution of 2.2 mol/dm³ $FeCl_3$+1.0 mol/cm³ HCl (temperature: 40° C.) for 1 minute at a pressure of 0.15 MPa. Thereafter, the aluminum substrate was immediately washed with water and dried. Subsequently, the cured resist was peeled off. Specifically, a shower treatment was performed with a 3% aqueous sodium hydroxide solution (temperature: 40° C.) for 1 minute at a condition of 0.15 MPa. Thereafter, washing and drying were carried out to obtain an aluminum substrate having through holes formed therein.

Example 5

An aluminum foil was prepared in the same manner as in Example 1 except that the method of forming the through holes was changed as follows, the average opening diameter of the through holes was set to 300 μm and the hole density was set to 3 holes/mm².

With reference to Example 1 described in JP2008-218559A, through holes were formed in the aluminum substrate under different conditions. Through hole was formed in the aluminum substrate having a thickness of 20 μm by punching using a die set with a hole diameter of 300 μm.

Example 6

An aluminum foil was prepared in the same manner as in Example 5 except that the die set was changed to a die set having a hole diameter of 500 μm, the average opening diameter of the through holes was set to 500 μm, and the hole density was 1 holes/mm².

Example 7

An aluminum foil was prepared in the same manner as in Example 2 except that the sum of quantities of electricity in (a) coating forming step above was changed to 750 C/dm², the sum of quantities of electricity in (b) through hole forming step above was changed to 750 C/dm², the average opening diameter of the through holes was set to 15 μm, the hole density was set to 140 holes/mm², and the thickness of the aluminum oxide film was set to 1 nm by changing the oxide film forming step as follows.

(Formation of Oxide Film (Oxide Film Forming Step))

Next, the aluminum substrate on which the through holes were formed was stored at a temperature of 25° C. and a humidity of 7% RH for 1 month and naturally oxidized to form an aluminum oxide film.

Example 8

An aluminum foil was prepared in the same manner as in Example 7 except that the oxide film forming step was changed as follows and the thickness of the aluminum oxide film was set to 4 nm.

(Formation of Oxide Film (Oxide Film Forming Step))

Next, the aluminum substrate on which the through holes were formed was stored at a temperature of 25° C. and a humidity of 7% RH for 2 months and naturally oxidized to form an aluminum oxide film.

Example 9

An aluminum foil was prepared in the same manner as in Example 7 except that the thickness of the aluminum oxide film was set to 8 nm by changing the oxide film forming step as follows.

(Formation of Oxide Film (Oxide Film Forming Step))

Next, the aluminum substrate on which the through holes were formed was stored at a temperature of 25° C. and a humidity of 15% RH for 3 months and naturally oxidized to form an aluminum oxide film.

Example 10

An aluminum foil was prepared in the same manner as in Example 7 except that the oxide film forming step was changed as follows and the thickness of the aluminum oxide film was set to 12 nm.

(Formation of Oxide Film (Oxide Film Forming Step))

Next, the aluminum substrate on which the through holes were formed was stored at a temperature of 25° C. and a humidity of 20% RH for 3 months and naturally oxidized to form an aluminum oxide film.

Example 11

An aluminum foil was prepared in the same manner as in Example 7 except that the oxide film forming step was changed as follows and the thickness of the oxide film was set to 25 nm.

(Formation of Oxide Film (Oxide Film Forming Step))

Next, the aluminum substrate on which the through holes were formed was stored at a temperature of 25° C. and a humidity of 30% RH for 3 months and naturally oxidized to form an aluminum oxide film.

Example 12

An aluminum foil was prepared in the same manner as in Example 7 except that the sum of quantities of electricity in (a) coating forming step above was changed to 750 C/dm², the sum of quantities of electricity in (b) through hole forming step above was changed to 750 C/dm², the average opening diameter of the through holes was set to 11 μm, the hole density was set to 140 holes/mm², and the thickness of the aluminum oxide film was set to 3 nm by changing the oxide film forming step as follows.

(Formation of Oxide Film (Oxide Film Forming Step))

Next, the aluminum substrate on which the through holes were formed was stored at a temperature of 25° C. and a humidity of 7% RH for 1.5 months and naturally oxidized to form an aluminum oxide film.

Example 13

An aluminum foil was prepared in the same manner as in Example 5 except that the die set was changed to a die set having a hole diameter of 300 μm, the average opening diameter of the through holes was set to 300 μm, and the hole density was set to 3 holes/mm².

Examples 14 and 15

Aluminum foils were prepared in the same manner as in Examples 12 and 13 except that the hydrophilic layer forming step was changed as follows.

(Formation of Hydrophilic Layer (Hydrophilic Layer Forming Step))

Next, the aluminum substrate on which the aluminum oxide film was formed was immersed in an aqueous sodium silicate solution at 60° C. for 5 seconds to form a hydrophilic layer, and then washed with water for 20 seconds to prepare an aluminum foil. As the aqueous sodium silicate solution, a 3% aqueous sodium silicate solution No. 3 (JIS K1408-1966) was used.

Comparative Examples 1 and 2

Aluminum foils were prepared in the same manner as in Examples 3 and 13 except that the hydrophilic layer forming step was not carried out (the hydrophilic layer was not formed).

Examples 16 and 17

Aluminum foils were prepared in the same manner as in Examples 12 and 13 except that the hydrophilic layer forming step was changed as follows.

(Formation of Hydrophilic Layer (Hydrophilic Layer Forming Step))

Next, the aluminum substrate on which the aluminum oxide film was formed was subjected to a hydrophilization treatment with polyvinyl phosphonic acid.

The hydrophilization treatment with polyvinyl phosphonic acid was carried out with reference to Example (1-a) of JP3318031B. Specifically, after the oxide film forming step, the aluminum substrate was immersed in a 0.2% aqueous solution of polyvinylphosphonic acid at 60° C. for 30 seconds and washed with water.

[Evaluation]

A positive electrode active material containing $LiCoO_2$ as a positive electrode material was applied to both surfaces of the aluminum foils prepared in Examples and Comparative Examples to prepare positive electrodes.

As the positive electrode active material, 90 parts by mass of $LiCoO_2$ powder and 10 parts by mass of a binder (KF polymer manufactured by Kureha Co., Ltd.) were added to water and dispersed to prepare a slurry.

Next, the prepared slurry was applied to both surfaces of the prepared aluminum foil by a die coater so as to have a total thickness of 200 μm, and dried at 120° C. for 30 minutes to form an active material layer on the surface of the aluminum foil. Thus, a positive electrode was prepared.

<Adhesiveness>

The adhesiveness between the aluminum foil and the active material layer was evaluated by a tape peel test.

In the tape peeling test, a double-sided tape "NYSTACK" manufactured by Nichiban Co., Ltd. was used as a pressure sensitive adhesive tape. One side of the pressure sensitive adhesive tape having a width of 15 mm was attached to the surface of the active material layer, the other side was attached to a stainless steel block, and the peeling state of the active material was evaluated in a case where the stainless steel block was peeled off.

A: Peeling does not occur.

B: Peeling occurs in a range of less than 10% of the entirety.

C: 10% or more of the entirety is peeled off.

<Conductivity>

Copper probes having a diameter φ of 2.8 cm were closely attached to the front and rear surfaces of the positive electrode prepared above by applying a load of 0.20 MPa, and the electric resistance value was measured using a resistance meter (RESISTANCE HiTESTER 3541 manufactured by Hioki E.E. Corporation) to evaluate conductivity.

The evaluation results are shown in Tables 1 to 3.

TABLE 1

| | Through hole | | Hydrophilic layer | | Evaluation | |
|---|---|---|---|---|---|---|
| | | | | | | Conductivity |
| | Average opening diameter μm | Hole density holes/mm² | Aluminum oxide film Thickness nm | Treatment method | Si adhesion amount mg/m² | Adhesiveness | (electric resistance value) mΩ |
| Example 1 | 1 | 900 | 5 | Sodium silicate No. 1 | 0.8 | A | 20 |
| Example 2 | 11 | 110 | 5 | Sodium silicate No. 1 | 0.8 | A | 20 |
| Example 3 | 20 | 160 | 5 | Sodium silicate No. 1 | 0.8 | A | 20 |
| Example 4 | 90 | 8 | 5 | Sodium silicate No. 1 | 0.8 | A | 25 |
| Example 5 | 300 | 3 | 5 | Sodium silicate No. 1 | 0.8 | B | 30 |
| Example 6 | 500 | 1 | 5 | Sodium silicate No. 1 | 0.8 | B | 30 |
| Comparative Example 1 | 20 | 160 | 5 | None | — | B | 55 |

TABLE 2

| | Through hole | | Hydrophilic layer | | Evaluation | |
|---|---|---|---|---|---|---|
| | Average opening diameter μm | Hole density holes/mm$^2$ | Aluminum oxide film Thickness nm | Treatment method | Si adhesion amount mg/m$^2$ | Adhesiveness | Conductivity (electric resistance value) mΩ |
| Example 7 | 15 | 140 | 1 | Sodium silicate No. 1 | 0.8 | A | 10 |
| Example 8 | 15 | 140 | 4 | Sodium silicate No. 1 | 0.8 | A | 17 |
| Example 9 | 15 | 140 | 8 | Sodium silicate No. 1 | 0.8 | A | 22 |
| Example 10 | 15 | 140 | 12 | Sodium silicate No. 1 | 0.8 | A | 27 |
| Example 11 | 15 | 140 | 25 | Sodium silicate No. 1 | 0.8 | A | 38 |
| Comparative Example 1 | 20 | 160 | 5 | None | — | B | 55 |

TABLE 3

| | Through hole | | Hydrophilic layer | | | Evaluation | |
|---|---|---|---|---|---|---|---|
| | Average opening diameter μm | Hole density holes/mm$^2$ | Aluminum oxide film Thickness nm | Treatment method | Si adhesion amount mg/m$^2$ | Adhesiveness | Conductivity (electric resistance value) mΩ |
| Example 12 | 5 | 160 | 3 | Sodium silicate No. 1 | 0.8 | A | 20 |
| Example 13 | 300 | 3 | 3 | Sodium silicate No. 1 | 0.8 | B | 30 |
| Example 14 | 5 | 160 | 3 | Sodium silicate No. 3 | 0.7 | A | 20 |
| Example 15 | 300 | 3 | 3 | Sodium silicate No. 3 | 0.7 | B | 30 |
| Example 16 | 5 | 160 | 3 | Treatment with polyvinyl phosphonic acid | — | A | 27 |
| Example 17 | 300 | 3 | 3 | Treatment with polyvinyl phosphonic acid | — | B | 36 |
| Comparative Example 1 | 20 | 160 | 5 | None | — | B | 55 |
| Comparative Example 2 | 300 | 3 | 3 | None | — | C | 60 |

From Tables 1 to 3, it is found that Examples of the present invention having an aluminum oxide film having a thickness of 25 nm or less and further having a hydrophilic layer on the surface of the aluminum oxide film can obtain better adhesiveness and higher conductivity than Comparative Examples.

Also, from the comparison of Examples 1 to 6, it is found that the average opening diameter of the through holes is preferably 1 μm or more and 500 μm or less and more preferably 1 μm or more and less than 100 μm.

Further, from the comparison of Examples 7 to 11, it is found that the thickness of the aluminum oxide film is preferably 1 nm to 12 nm.

Further, from the comparison of Examples 12 to 17, it is found that the hydrophilic layer preferably contains a compound having silicate.

From the above, the effect of the present invention is obvious.

EXPLANATION OF REFERENCES

1: aluminum substrate
2: aluminum hydroxide film
3: aluminum substrate having through holes
4: aluminum hydroxide film having through holes
5: through hole
10: aluminum foil
14: aluminum oxide film
16: hydrophilic layer

What is claimed is:

1. An aluminum foil having through holes comprising:
an aluminum oxide film having a thickness of 25 nm or less on a surface of the aluminum foil; and
further a hydrophilic layer on at least a part of a surface of the aluminum oxide film,
wherein the hydrophilic layer contains a compound having at least one structure selected from the group consisting of silicate, phosphate, sulfonic acid, sulfonate, phosphonic acid, phosphonate, phosphate ester, phosphate ester salt, and fluorinated zirconic acid.

2. The aluminum foil according to claim 1, wherein the aluminum oxide film has a density of 2.7 to 4.1 g/cm$^3$.

3. The aluminum foil according to claim 2, wherein the aluminum oxide film having a thickness of 25 nm or less contains at least one of aluminum oxide, aluminum oxide monohydrate, or aluminum oxide trihydrate.

4. The aluminum foil according to claim 3, wherein the aluminum oxide film has a thickness of 1 nm to 15 nm.

5. The aluminum foil according to claim 4, wherein an average opening diameter of the through holes is 1 μm to 500 μm.

6. The aluminum foil according to claim 5, wherein a hole density of the through holes is 1 to 1000 holes/mm$^2$.

7. The aluminum foil according to claim 6, wherein the aluminum foil has a thickness of 5 μm to 100 μm.

8. The aluminum foil according to claim 7, wherein the aluminum oxide film is provided on both surfaces of the aluminum foil, and further the hydrophilic layer is provided on at least a part of the surface of each of the aluminum oxide films on the both surfaces.

9. An aluminum member for electrodes comprising the aluminum foil according to claim 7.

10. The aluminum foil according to claim 1, wherein the aluminum oxide film having a thickness of 25 nm or less contains at least one of aluminum oxide, aluminum oxide monohydrate, or aluminum oxide trihydrate.

11. The aluminum foil according to claim 1, wherein the aluminum oxide film has a thickness of 1 nm to 15 nm.

12. The aluminum foil according to claim 1, wherein an average opening diameter of the through holes is 1 μm to 500 μm.

13. The aluminum foil according to claim 1, wherein a hole density of the through holes is 1 to 1000 holes/mm$^2$.

14. The aluminum foil according to claim 1, wherein the aluminum foil has a thickness of 5 μm to 100 μm.

15. The aluminum foil according to claim 1, wherein the aluminum oxide film is provided on both surfaces of the aluminum foil, and further the hydrophilic layer is provided on at least a part of the surface of each of the aluminum oxide films on the both surfaces.

16. An aluminum member for electrodes comprising the aluminum foil according to claim 1.

* * * * *